US012261658B2

(12) United States Patent
Singh et al.

(10) Patent No.: US 12,261,658 B2
(45) Date of Patent: Mar. 25, 2025

(54) NON-LINE OF SIGHT (NLOS) COMMUNICATION UTILIZING HYBRID ACTIVE-PASSIVE INTELLIGENT SURFACES AND METHODS THEREOF

(71) Applicant: Dell Products L.P., Round Rock, TX (US)

(72) Inventors: Tejinder Singh, Kanata (CA); Davi V. Q. Rodrigues, Lubbock, TX (US)

(73) Assignee: Dell Products L.P., Round Rock, TX (US)

( * ) Notice: Subject to any disclaimer, the term of this patent is extended or adjusted under 35 U.S.C. 154(b) by 21 days.

(21) Appl. No.: 18/310,241

(22) Filed: May 1, 2023

(65) Prior Publication Data

US 2024/0372580 A1    Nov. 7, 2024

(51) Int. Cl.
*H04B 7/04* (2017.01)
*H04B 7/145* (2006.01)
*H04B 7/15* (2006.01)

(52) U.S. Cl.
CPC ......... *H04B 7/04013* (2023.05); *H04B 7/145* (2013.01); *H04B 7/15* (2013.01)

(58) Field of Classification Search
CPC .................................................. H04B 7/04013
USPC ....................................................... 375/262
See application file for complete search history.

(56) References Cited

U.S. PATENT DOCUMENTS

| 11,956,059 | B2 * | 4/2024 | Meyer | H04B 7/145 |
| 2012/0015603 | A1 * | 1/2012 | Proctor, Jr. | H01Q 21/28 455/11.1 |
| 2012/0258746 | A1 * | 10/2012 | Tokgoz | H04J 11/0059 455/501 |
| 2017/0310285 | A1 * | 10/2017 | Huang | H03F 1/02 |
| 2023/0142735 | A1 * | 5/2023 | Raghavan | H04W 72/12 370/315 |
| 2024/0172163 | A1 * | 5/2024 | Alizadeh | H04L 1/1607 |

OTHER PUBLICATIONS

Wu et al., "Towards Smart and Reconfigurable Environment: Intelligent Reflecting Surface Aided Wireless Network", IEEE Communications Magazine, vol. 58, No. 1, pp. 106-112, Aug. 30, 2019.

(Continued)

*Primary Examiner* — Lihong Yu
(74) *Attorney, Agent, or Firm* — Workman Nydegger

(57) ABSTRACT

One example method includes receiving inputs (1) specifying a total power amount for the communication system, (2) specifying communication system operational parameters, and (3) specifying a number of elements implemented in the IRS. Based on the inputs, a portion of the total power amount needed to switch an element of the IRS from a passive element to an active element, an amplification amount of the element, and the SNR of the wireless signal received at the receiver when the first element is an active element are calculated for all combinations of elements of the IRS. Based on the calculations, a number of elements implemented in the IRS are selected to switch from passive elements to active elements that will result in a maximum SNR of the wireless signal received at the receiver.

20 Claims, 11 Drawing Sheets

(56) References Cited

OTHER PUBLICATIONS

El-Mossallamy et al., "Reconfigurable Intelligent Surfaces for Wireless Communications: Principles, Challenges, and Opportunities", IEEE Transactions on Cognitive Communications and Networking, vol. 6, No. 3, pp. 990-1002, May 5, 2020.

Long et al., "Active Reconfigurable Intelligent Surface-Aided Wireless Communications", IEEE Transactions on Wireless Communications, vol. 20, No. 8, pp. 4962-4975, Mar. 1, 2021.

Poulakis, "6G's Metamaterials Solution: There's plenty of bandwidth available if we use reconfigurable intelligent surfaces", IEEE Spectrum, vol. 59, No. 11, pp. 40-45, Nov. 2022.

Sihlbom et al., "Reconfigurable Intelligent Surfaces: Performance Assessment Through a System-Level Simulator", IEEE Wireless Communications, arXiv:2111.10791v1, Nov. 21, 2021.

Mosleh et al., "Ergodic Capacity Analysis of Reconfigurable Intelligent Surface Assisted MIMO Systems Over Rayleigh-Rician Channels", IEEE Communications Letters, vol. 27, No. 1, Nov. 9, 2022.

Zeng et al., "Reconfigurable Intelligent Surfaces in 6G: Reflective, Transmissive, or Both?", IEEE Communications Letters, arXiv:2102.06910v1, Feb. 13, 2021.

Jung et al., "Performance analysis of large intelligent surfaces (LISs): Asymptotic data rate and channel hardening effects," IEEE Trans. Wireless Commun., vol. 19, No. 3, pp. 2052-2065, Dec. 26, 2019, arXiv:1810.05667v4.

Wang et al., "Secure Satellite Transmission with Active Reconfigurable Intelligent Surface", IEEE Communications Letters, vol. 26, No. 12, pp. 3029-3033, Sep. 16, 2022.

Zeng et al., "Reconfigurable Intelligent Surface (RIS) Assisted Wireless Coverage Extension: RIS Orientation and Location Optimization", IEEE Communications Letters, vol. 25, No. 1, pp. 269-273, Sep. 17, 2020, arXiv:2009.08038v1.

Ntontin et al., "Optimal Reconfigurable Intelligent Surface Placement in Millimeter-Wave Communications", in Proc. 15th European Conference on Antennas and Propagation (EuCAP), Dec. 2020, pp. 1-5, arXiv:2011.09949v2.

Zhi et al., "Active RIS Versus Passive RIS: Which is Superior With the Same Power Budget?", IEEE Communications Letters, vol. 26, No. 5, pp. 1150-1154, Dec. 14, 2021, arXiv:2112.07510v1.

Dong et al., "Active Reconfigurable Intelligent Surface Aided Secure Transmission", IEEE Transactions on Vehicular Technology, vol. 71, No. 2, pp. 2181-2186, Dec. 20, 2021, arXiv:2112.10332v1.

Ma et al., "Reflection and Relay Dual-Functional RIS Assisted MU-MISO Systems", 2022 IEEE Wireless Communications and Networking Conference (WCNC), pp. 387-392, Mar. 22, 2022, arXiv:2107.11579v4.

Nguyen et al., "Downlink Throughput of Cell-Free Massive MIMO Systems Assisted by Hybrid Relay-Reflecting Intelligent Surfaces", in Proc. International Conference on Communications, May 16, 2022, pp. 1475-1480.

Nguyen et al., "Spectral Efficiency Optimization for Hybrid Relay-Reflecting Intelligent Surface", in Proc. IEEE International Conference on Communications Workshops (ICC Workshops), pp. 1-6, May 1, 2021, arXiv:2105.00345v1.

\* cited by examiner

Algorithm 1 Proposed Algorithm

1. Input: $K, P_{DO}, \sigma_A^2, \sigma^2, \xi, N$
2. for $j = 1, 2, ..., N$ do
3.    $M = j$
4.    if $K > MP_{DC}$
5.      find positive roots $f(\beta) = 0$
6.      return $S = \{\beta_+, \beta_{++}\}$ or $S = \emptyset$
7.      if $S = \emptyset$
8.         $SNR_j = \gamma(M, \beta_{max})$
9.      elseif $\max\{\gamma(M, \beta_+), \gamma(M, \beta_{++}), \gamma(M, \beta_{min}), \gamma(M, \beta_{max})\}$
10.         $= \gamma(M, \beta_+)$ and $\beta_{min} < \beta_+ < \beta_{max}$
11.         $SNR_j = \gamma(M, \beta_+)$
12.      elseif $\max\{\gamma(M, \beta_+), \gamma(M, \beta_{++}), \gamma(M, \beta_{min}), \gamma(M, \beta_{max})\}$
13.         $= \gamma(M, \beta_{++})$ and $\beta_{min} < \beta_{++} < \beta_{max}$
14.         $SNR_j = \gamma(M, \beta_{++})$
15.      else
16.         $SNR_j = \max\{\gamma(M, \beta_{min}), \gamma(M, \beta_{max})\}$
17.      end if
18.    else
19.      $SNR_j = \gamma(0,0)$
20.    endif
21. endfor
22. Output: $\gamma^* = \max\{SNR_j\}|_{j=1:1:M}$

*FIG. 7*

NON-LINE OF SIGHT (NLOS) COMMUNICATION UTILIZING HYBRID ACTIVE-PASSIVE INTELLIGENT SURFACES AND METHODS THEREOF

FIELD OF THE INVENTION

Embodiments of the present invention generally relate to communication systems. More particularly, at least some embodiments of the invention relate to systems, hardware, software, computer-readable media, and methods for using hybrid active-passive intelligent reflective surfaces in a non-line of sight communication system.

BACKGROUND

With the advance of the 5G and Internet of Things (IoT) technology, massive terminal equipment and limited spectrum resources give rise to many challenges to high-speed communication. To overcome these challenges, the technique of millimeter-wave communication has been proposed to improve the system throughput by expanding the available frequency band (30-300 GHz). In order to achieve stable and reliable millimeter-wave wireless communication, diverse new technologies have been conceived. For example, ultra-dense networks have been proposed to establish stronger communication links and achieve better spatial reuse by deploying relatively dense base stations or access points in hotspots. However, it also means higher hardware cost and power consumption, meanwhile, the interference between users is more serious, including intra-cell interference and inter-cell interference, which reduces the energy efficiency. Similarly, massive multiple-input multiple-output (MIMO) systems have been proposed to improve spectral efficiency by deploying large-scale antenna arrays. However, the complex signal processing algorithms and a large number of radio frequency (RF) chains are essential for massive MIMO which greatly increases the hardware cost. In addition, the transmission of electromagnetic waves (EM) is largely uncontrollable due to the scattering and diffraction of EM waves in complex environments. Hence, the transmission of EM radiation is also largely uncontrollable. To solve the above issues, novel technologies and methods are needed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 7 illustrates aspects of an example algorithm according to the embodiments disclosed herein.

DETAILED DESCRIPTION OF SOME EXAMPLE EMBODIMENTS

Figure 1:
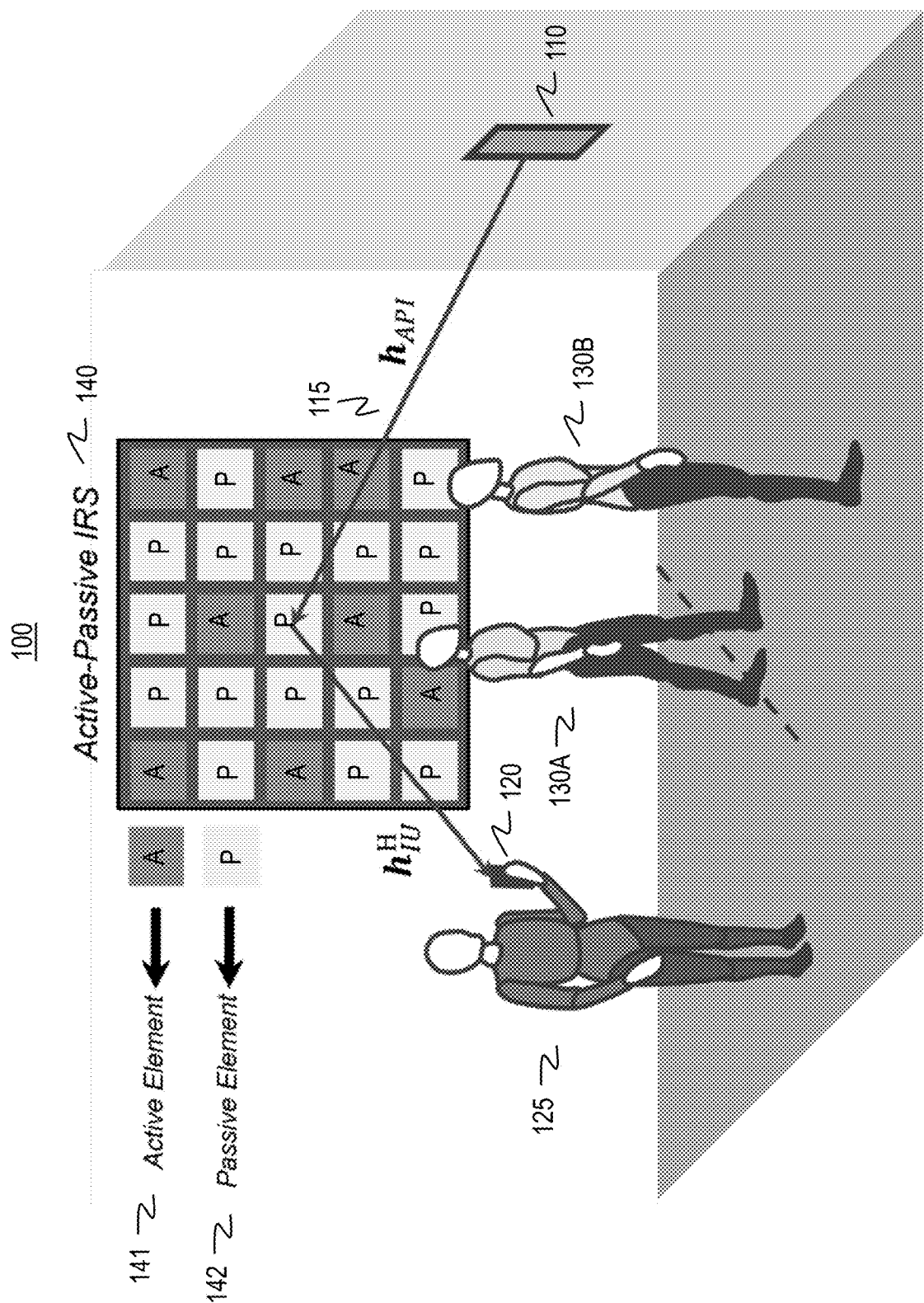
FIG. 1 discloses aspects of an example SISO communication system according to the embodiments disclosed herein.

Embodiments of the present invention generally relate to communication systems. More particularly, at least some embodiments of the invention relate to systems, hardware, software, computer-readable media, and methods for using hybrid active-passive intelligent surfaces in a non-line of sight communication system.

In general, example embodiments disclosed herein cope with the product-distance round-trip path loss attenuation in scenarios where limited power is available to the active loads by implementing a hybrid active-passive intelligent reflective surfaces (IRS) topology to improve signal quality on single-input single-output (SISO) communications non-line-of sight (NLOS) scenarios. The optimal number of active and passive IRS elements and their corresponding optimal amplification gains are derived. Specifically, an optimization technique is implemented to maximize the achievable rate for the hybrid IRS-aided SISO system that operates in the non-line-of sight (NLOS) scenario based on analytical derivations of a closed-form solution. With reference to a fixed power allocation to the transmitter and the amplification elements at the IRS, optimal amplification gains are derived for the passive and active loads, and the optimal power splitting for signal transmission and for signal reflection at the IRS. The performance of the proposed optimization strategy is numerically compared to the performance of non-optimized systems with fixed power allocation and an equivalent fully passive IRS system. The superiority of the hybrid IRS topology associated with the provided technique is evident when the overall power budget is small.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. Also, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example SISO Wireless Communication System

FIG. 1 illustrates an example embodiment of a single-input single-output (SISO) wireless communication system. As illustrated, the SISO communication system 100 includes a single antenna transmitter 110, also referred to as an access point (AP), that transmits a wireless signal 115 to a receiver 120, such as a single antenna receiver. The transmitter 110 may be any reasonable transmitter that is able to transmit the wireless signal 115 to the receiver 120. Accordingly, the embodiments disclosed herein are limited to any particular type of transmitter 110.

As also illustrated, the SISO communication system 100 includes the receiver 120. In the illustrated embodiment, the receiver 120 is a mobile phone that is being held by a user 125. However, the receiver 120 may be any reasonable receiver that is able to receive the wireless signal 115 from the transmitter 110. Accordingly, the embodiments disclosed herein are limited to any particular type of receiver 120.

As further illustrated in FIG. 1, the direct path for the wireless signal 115 is blocked by the presence of various obstacles 130A and 130B. In the illustrated embodiment, the obstacles 130A and 130B are other humans that are between the transmitter 110 and the receiver 120. However, the obstacles 130A and/or 130B could also be a wall or some other type of object that blocks a direct line of sight between the transmitter 110 and the receiver 120.

Accordingly, as shown FIG. 1, the wireless signal 115 propagates from the transmitter 110 to the receiver 120 through an indirect path that includes an Intelligent Reflective Surface (IRS) 140. The IRS 140 is a surface equipped with various reflective elements made of metamaterials. Tunable electronic circuits are employed to reinforce the signal strength in specific locations of the environment by adjusting the phases of the impinging signals. That is, each element of the IRS typically has an electronic circuit that can be powered on so that the element is able to provide some signal amplification. The IRS 140 may be implemented as a microwave/mm-wave planar structure that includes the various reflective elements. The IRS 140 may include reflect arrays, liquid crystal surfaces, and software-ware defined meta-surfaces. Accordingly, the embodiments disclosed herein contemplate many different implementations of the IRS 140 and are not limited to any particular implementation of the IRS 140.

The IRS 140 may be a fully passive IRS that only includes a number of passive elements. The passive elements are able to shift the phase of the wireless signal 115, but do not provide any amplification of the signal. Alternatively, the IRS 140 can also be fully active IRS that includes a number of active elements. The active elements are able to shift the phase of the wireless signal 115 like the passive elements, but are also able to provide amplification to the wireless signal. Providing the amplification requires power to be provided to the IRS. Further, the IRS 140 can be a hybrid IRS having a combination of passive and active elements.

As illustrated in FIG. 1, the IRS 140 is implemented as a hybrid IRS that has a number of active elements 141 and a number of passive elements 142. For example, the IRS 140 includes 25 total elements, eight of which are active elements 141 as indicated by the label "A" and 17 of which as passive elements 142, as illustrated by the label "P". As will be explained in more detail to follow, the number of active elements to implement in an IRS will be dependent on various factors such as the overall power that is available for use by the IRS and the transmitter 110 and the desired signal-to-noise (SNR) at the receiver 120.

For example, in realistic scenarios, the use of fully active IRS systems might suffer from limited power availability for the active loads. That is, the system may not have enough power available to make all of the IRS elements into active elements. However, in such scenarios some amplification may be needed, thus ruling out the use of fully passive IRS systems.

Advantageously, a hybrid IRS is able to add active elements to the conventional passive IRS, allowing them to reflect and amplify incident signals simultaneously. As a result, the hybrid IRS can reduce effects of the double path loss and significantly improve the system performance in terms of energy efficiency and reliability. These advantages are achieved with a much lower cost of power consumption and hardware design when compared to the fully active IRS.

The advantages provided by a hybrid IRS can usually be achieved by only implementing a small number of the overall IRS elements as active elements. For example, in FIG. 1 there are 25 total elements in the IRS 140, but there are only eight active elements 141. Only implementing the lowest number of active elements 141 provides the increased signal amplification while also limiting the overall power needed and potentially lowering the hardware cost. Thus, it is desirable to optimize the number of active and passive elements of the IRS 140 given the desired signal received at the receiver 120. Advantageously, the principles of the current invention disclosed herein provide for a system and method that maximizes the SNR of the signals received by the receiver 120 by jointly optimizing the number of active elements, the number of passive elements, and the amplifying/reflecting coefficients of the elements.

B. Example System Model and Design

An example system and model design that maximizes the SNR of the signals received by the receiver 120 by jointly optimizing the number of active elements, the number of passive elements, and the amplifying/reflecting coefficients of the elements will now be explained with reference to the SISO system of FIG. 1 that is assisted by the IRS 140. Since the direct path between the receiver 120 and the transmitter 110 is blocked by the presence of other obstacles 130A and 130B, the wireless signal 115 propagates from the transmitter 110 to the receiver 120 through the indirect path shown in FIG. 1. The IRS 140 implemented as a hybrid IRS with N elements (N is 25 in the embodiment of FIG. 1) is employed so the signal quality at the user can be improved.

The IRS-receiver 120 link or path (also referred to as the IRS-user link) and the transmitter 110-IRS link or path (also referred to as the access point (AP)-IRS link) are modeled as $$h_{IU} = h_{IU}[e^{j(\delta_{IU_1})}, \ldots, e^{j(\delta_{IU_n})}]^T \text{ and }$$

$$h_{API} = h_{API}[e^{j(\delta_{API_1})}, \ldots, e^{j(\delta_{API_n})}]^T.$$

$\delta_{IU_n}$ is the phase delay along the path linking the user (i.e., the receiver 120) and the $n^{th}$ IRS element, and $S_{API_n}$ is the phase delay for the link between the $n^{th}$ IRS element and the AP (i.e., the transmitter 110). $h_{IU} = \sqrt{\kappa_{IU} d_{IU}^{-\eta_{IU}}}$ and $h_{API} = \sqrt{\kappa_{API} d_{API}^{-\eta_{API}}}$ are the free-space path-loss factors, $\kappa_{IU}$ and $\kappa_{API}$ represent the reference strength for the channel at unit distance (1 m), $d_{IU}$ and $d_{API}$ are the distances between the IRS and the user, and between the AP and the IRS, respectively, and $\eta_{IU}$ and $\eta_{API}$ are the path-loss exponents. It is assumed that the receiver 120 and the transmitter 110, are always in the far-field region of the IRS. The received signals are given as $$y = \sqrt{P_{AP}} h_{IU}^H \Theta h_{API} x + h_U^H \psi n_{en} + n \quad (1)$$

where x~CN(0,1) denote the transmitted symbol, $P_{AP}$ is the transmit power, $h_{IU}^H \in \mathbb{C}^{1 \times N}$ and $h_{API} \in \mathbb{C}^{N \times 1}$ are the channel coefficients from the IRS to the AP and from the AP and the IRS, respectively, and n~CN(0,$\sigma^2$) is the noise at the receiver. The IRS reflection matrix is denoted as $\Theta = \text{diag}\{\alpha_1 e^{j\theta_1}, \alpha_2 e^{j\theta_2}, \ldots, \alpha_n e^{j\theta_n}\} \in \mathbb{C}^{N \times N}$ where $\alpha_n \in [\beta_{min}, \beta_{max}]$, $\beta_{min} > 1$, $0 \leq \theta_n \leq 2\pi$, if the $n^{th}$ IRS element amplifies the incident signals, or $\alpha_n \in ]0,1[$ and $0 \leq \theta_n \leq 2\pi$, if the IRS element attenuates incident signals. Without loss of generality, it is assumed that M elements actively boost the power level of the impinging signals while N-M IRS elements operate on the passive mode. Then, the reflection IRS matrix composed only by the active elements can be represented by $\psi = \text{diag}\{\alpha_1 e^{j\theta_1}, \alpha_2 e^{j\theta_2}, \ldots, \alpha_M e^{j\theta_M}, 0, \ldots 0\} \in \mathbb{C}^{N \times N}$. Finally, $n_{en} \sim CN(0, \sigma_A^2 I_N)$ represents the thermal noise introduced by the active IRS elements 141.

Based on (1), the signal-to-noise ratio (SNR) for the indirect link can be expressed as $$\gamma = \frac{P_{AP}|h_U^H \Theta h_{API}|^2}{|h_{IU}^H \psi n_{en}|^2 + \sigma^2} = \frac{P_{AP} h_{API}^2 h_{IU}^2 \left(\sum_{n=1}^N \alpha_n\right)^2}{\sigma^2 + h_{IU}^2 \sigma_A^2 \sum_{n=1}^M \alpha_n^2} \quad (2)$$

where $\theta_m = \arg(h_{IU}|_{n=m}) - \arg(h_{API}|_{n=m})$, $\forall m$, which is the optimal design for $\Theta$.

The achievable rate of the communications system assisted by the hybrid IRS 140 is given by $R = \log_2(1+\gamma)$. To maximize the achievable rate, the joint optimization of $P_{AP}$ and the reflection coefficient vector $\alpha = (\alpha_1, \alpha_2, \ldots, \alpha_n) \in \mathbb{R}_+^{1 \times N}$ is required. Under fixed power allocation to the transmit power $P_{AP}$, the biasing power needed to drive the active elements of the IRS, and the power reflected by the active loads, the optimization problem is formulated as $$\max_{P_{AP}, \alpha, M} \gamma \quad (3a)$$

$$\text{s.t.: } MP_{DC} + (h_{API}^2 P_{AP} + \sigma_A^2) \sum_{n=1}^M \alpha_n^2 \leq P_{ACT} \quad (3b)$$

$$\beta_{min} \leq \alpha_n \leq \beta_{max}, \text{ if } 1 \leq n \leq M \quad (3c)$$

$$0 < \alpha_n < 1, \text{ if } M < n \leq N \quad (3d)$$

$$P_{AP} + P_{ACT} = K \quad (3e)$$

where $P_{DC}$ is the DC power consumption for each active element, $P_{ACT}$ is the power allocated to the active IRS elements, and $K \in \mathbb{R}_+$ is the constant overall power to be used for signal transmission at the AP and for the active elements of the IRS after biasing the transmitter, the switch circuits, and the controller at the IRS.

Since a direct path is not available for the scenario shown in FIG. 1, the constant power K should be allocated in an optimal manner between the transmitter 110 and the IRS 140 so the maximum SNR is observed at the receiver 120. Invoking the Cauchy-Schwartz inequality, the following can be written $$\gamma = \frac{P_{AP} h_{API}^2 h_{IU}^2 \left(\sum_{n=1}^N \alpha_n\right)^2}{\sigma^2 + h_{IU}^2 \sigma_A^2 \sum_{n=1}^M \alpha_n^2} \leq \frac{P_{AP} h_{API}^2 h_{IU}^2 \left(\sum_{n=1}^N \alpha_n\right)^2}{\sigma^2 + \frac{h_{IU}^2 \sigma_A^2 \left(\sum_{n=1}^M \alpha_n\right)^2}{M}}. \quad (4)$$

Therefore, the maximum value of $\gamma$ is achieved if and only if $\alpha_1 = \alpha_2 = \ldots = \alpha_M = \beta$. For simplicity, it is assumed that the amplification gains of the passive IRS elements are equal to $\xi$, $\xi \in ]0,1[$. Clearly, the objective function (5a) increases with $P_{AP}$. Then make $P_{AP} = (K - MP_{DC} - \sigma_A^2 M\beta)/(h_{API}^2 M\beta^2 + 1)$. After substituting (3e) in (3b), the optimization problem can be reformulated as follows.

$$\max_{\beta \in \mathbb{R}_+, M \in \mathbb{N}} \gamma = \frac{h_{API}^2 h_{IU}^2 (K - MP_{DC} - \sigma_A^2 M\beta)(M\beta + (N-M)\xi)^2}{(h_{API}^2 M\beta^2 + 1)(\sigma^2 + h_{IU}^2 \sigma_A^2 M\beta^2)} \quad (5a)$$

$$\text{s.t.: } \beta_{min} \leq \beta \leq \beta_{max} \quad (5b)$$

$$1 \leq M < N. \quad (5c)$$

Note that by varying the parameter $M \in \mathbb{N}$ between 1 and $\mathbb{N}$, the objective function becomes uniquely dependent on $\beta$. Then, it is assumed that M is fixed as $M_1$ and $\beta \in \mathbb{R}_+$. After applying the first-order derivative to $\gamma$ with regard to $\beta$, the following is found $$\frac{\partial \gamma}{\partial \beta} = \frac{\kappa f(\beta)(1 + B\beta)}{(CD\beta^4 + (C+D)\beta^2 + 1)^2} \quad (6)$$

where $\kappa = 2h_{API}^2 h_{IU}^2 (K - M_1 P_{DC})((N-M_1)\xi)/\sigma_A^2$, $A = M_1 \sigma_A^2 (K - M_1 P_{DC})$, $B = M_1/(N-M_1)\xi$, $C = h_{API}^2 M_1$, $D = h_{IU}^2 \sigma_A^2 M_1/\sigma^2$, $f(\beta) = ACD\beta^5 + (-AB(C+D) - BCD)\beta^4 - 2CD\beta^3 - 2AB\beta^2 + (-A-(C+D))\beta + B$. The first-order polynomial $(1+B\beta)$ has one negative root, so it only assumes positive values when $\beta > 0$ since $B > 0$. According to the Descartes' rule of signs, the fifth-order polynomial $f(\beta)$ have 0 or 2 positive roots. If $f(\beta)$ has no roots for $\beta > 0$, the optimal value of $\beta = \beta_{max}$ because $\gamma(\beta, M_1)$ would monotonically increase with $\beta$. On the other hand, if $f(\beta)$ have two positive roots $\beta_+$ and $\beta_{++}$, clearly $f(\beta)>0$ when $0>\beta>\beta_+$ and $\beta>\beta_{++}$. In contrast, $f(\beta)<0$ when $\beta_+>\beta>\beta_{++}$. Therefore, to maximize $\gamma(\beta, M_1)$, either $\beta^*=\beta_+$ or $\beta^*=\beta_{max}$. As a matter of fact, if $\gamma(\beta_+, M_1)>\gamma(\beta_{max}, M_1)$, the optimal value of $\beta$ is $\beta_+$ if $\beta_{min}>\beta_+>\beta_{max}$ Similarly, if $\gamma(\beta_{max}, M_1)>\gamma(\beta_+, M_1)$, the optimal value of $\beta$ is $\beta_{max}$. Although the fifth-order polynomial equation $f(\beta)=0$ cannot be solved using radicals, the potential roots $\beta_+$ and $\beta_{++}$ can be easily found numerically in a computationally efficient manner on the interval $0 \leq \beta \leq \beta_{max}$.

C. Numerical Results

Figure 2:
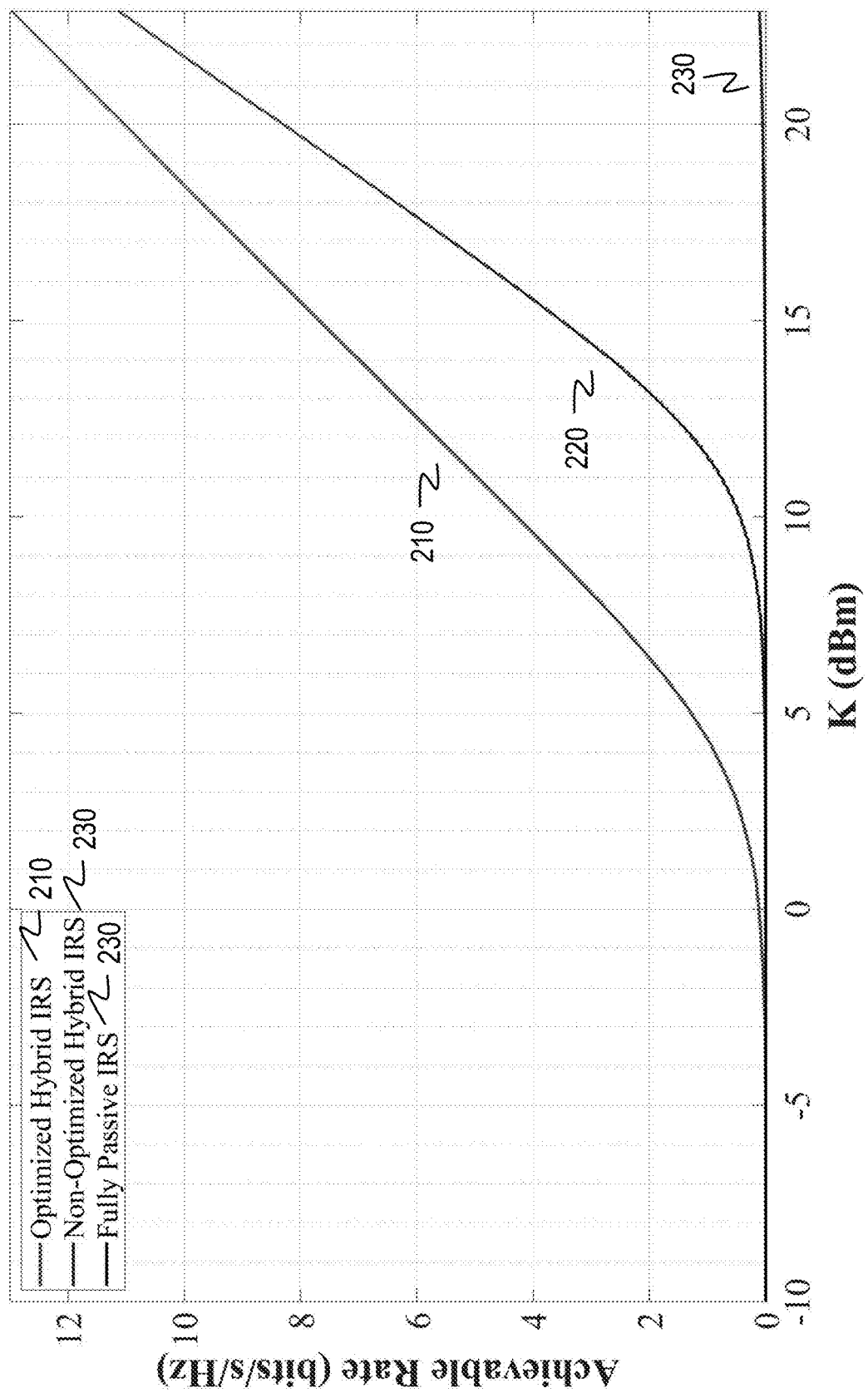
FIG. 2 discloses performance aspects of the embodiments disclosed herein.

The performance of the example system and design discussed in the previous section will now be described. The performance of the example system is first evaluated when the overall power to be used by the transmitter 110 and the active elements 141 of the IRS 140 after biasing the transmitter and the switch and controller circuits at the IRS 140, i.e., K is varied. FIG. 2 reports the achievable rate obtained by using the disclosed design is shown at 210. The performance obtained by a non-optimized design with the overall power equally allocated between the active IRS elements 141 and the transmitter 110 is shown at 220, and SNR evaluated for a fully passive IRS with $P_{AP}=K$ is shown at 230.

Using the system of FIG. 1 as a reference, the transmitter 110 is located at (0,0,0) m, while the receiver 120 and the hybrid IRS 140 are placed at (0, 30, 0) m and (−7, 12, 4) m, respectively. N=400 for all IRS configurations, $P_{DC}=-5$ dm, $\sigma^2=\sigma_A^2=-85$ dBm, $\kappa_{IU}=\kappa_{API}=-60$ dB, and $\eta_{IU}=\eta_{API}=-2$. The antenna gains are set to 3 dBi at the transmitter 110 and the IRS 140. As shown in FIG. 2, the disclosed optimized design always offers larger achievable rate for different values of K as compared to a non-optimized design with $P_{AP}=P_{ACT}=K/2$, and a fully passive IRS system with $P_{AP}=K$.

Figure 3:
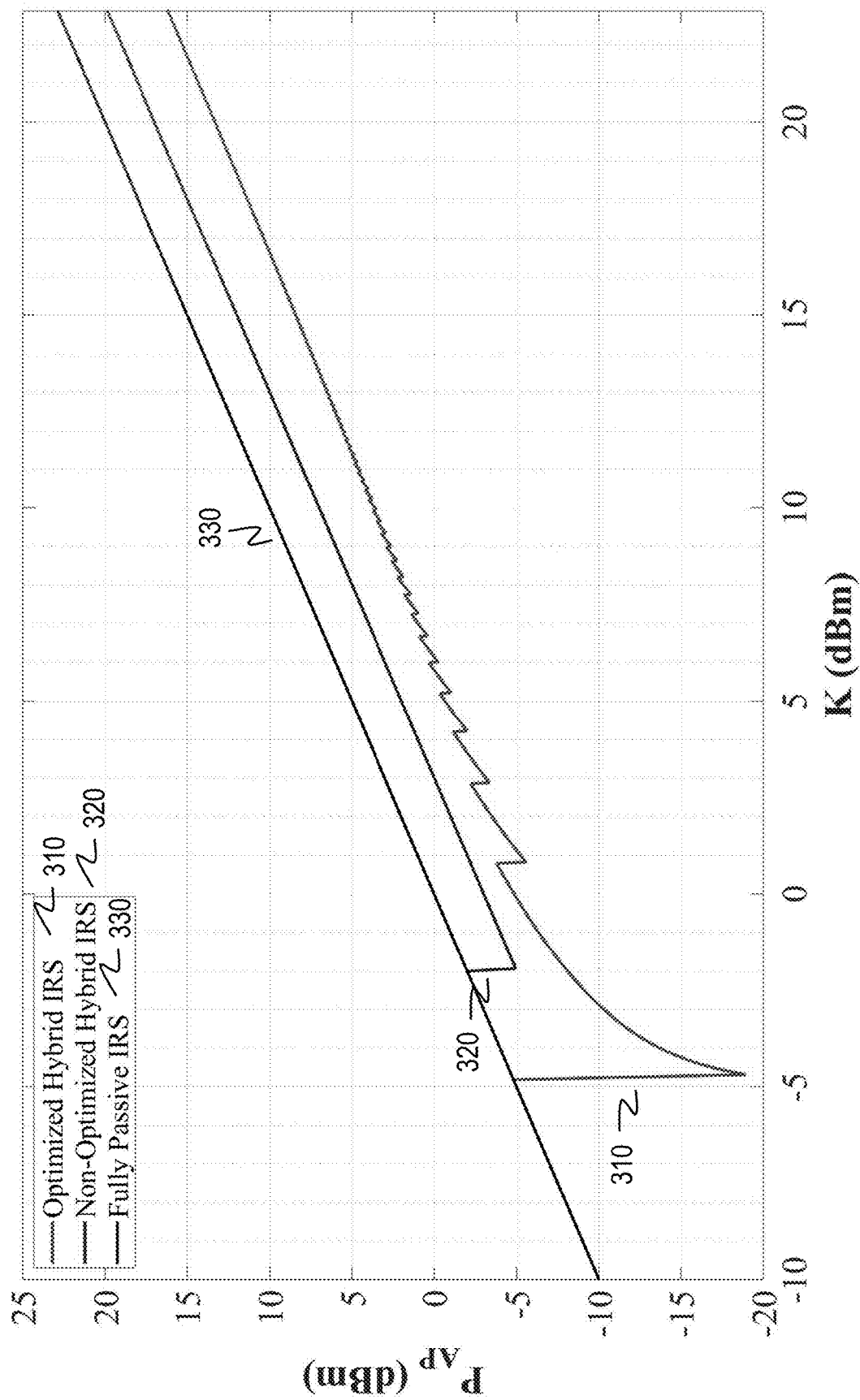
FIG. 3 discloses performance aspects of the embodiments disclosed herein.

FIG. 3 illustrates the changes on $P_{AP}$ as K increases. In this plot, it is possible to observe that the active elements 141 at IRS 140 are slowly turned on when the allocated power is larger than −5 dBm. This means that, for the same power budget, hybrid IRS with a larger number of active elements and lower amplification gains perform better than hybrid surfaces with lower number of active elements but larger amplification gains. Although, the transmitter's output power for the optimized system is always lower than the $P_{AP}$ for the non-optimized and fully passive systems, the achievable rate, which is the parameter of interest, is always larger for the optimized system. In FIG. 3, 310 shows the disclosed optimized design, 320 shows the non-optimized design, and 330 shows the fully passive IRS system.

Figure 4:
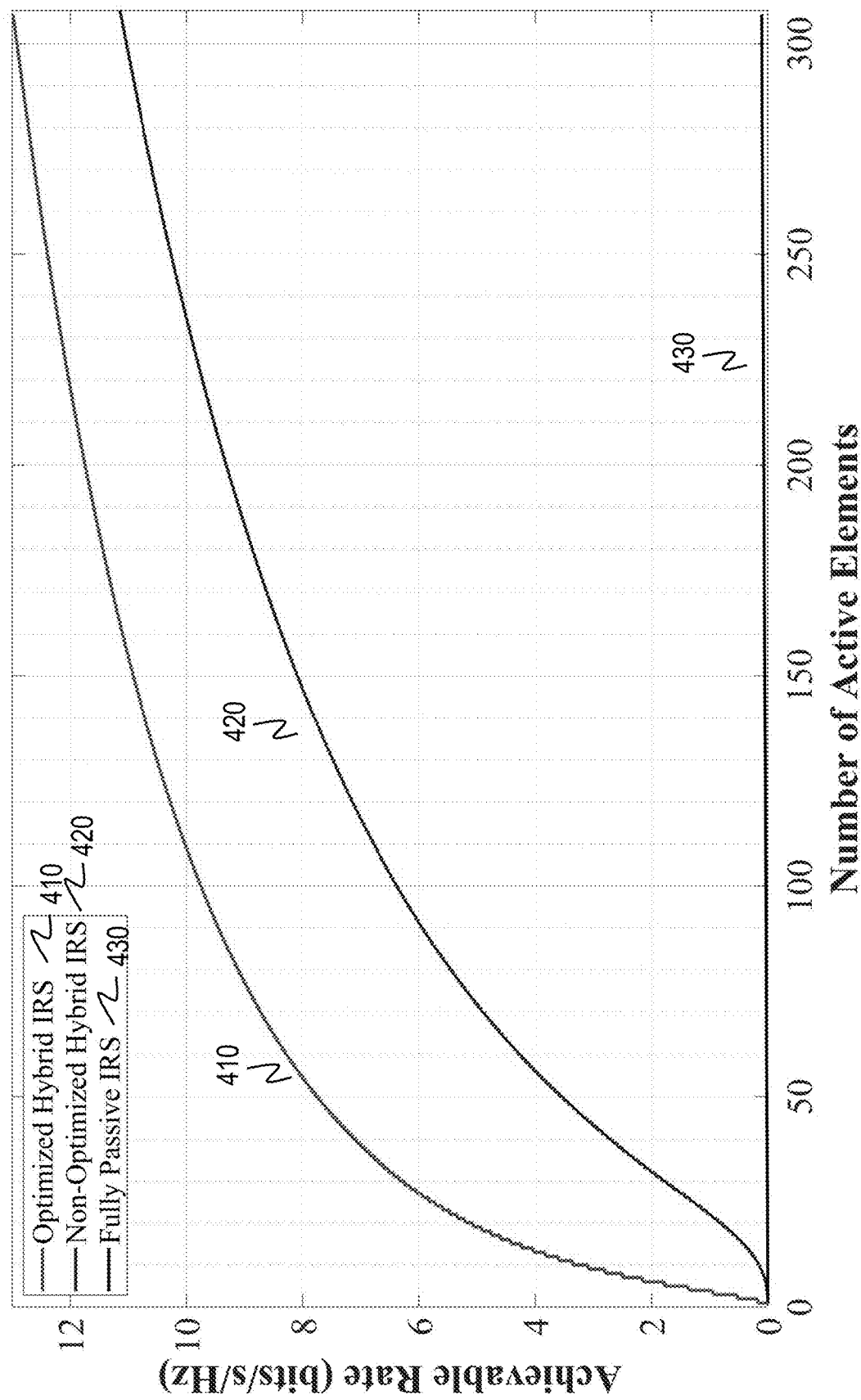
FIG. 4 discloses performance aspects of the embodiments disclosed herein.

In FIG. 4, the achievable rate is shown as a function of the number of active elements 141 at the IRS 140 when K varies from −10 dBm to 22.9 dBm. When the allocated power is small, an equivalent number of active elements 141 provides better SNR for the optimized system as compared to the non-optimized system with equal power splitting between the transmitter 110 and the IRS 140. As the allocated power increases, the difference between the achievable rates calculated for both the optimized and non-optimized systems start to get smaller. In FIG. 4, 410 shows the disclosed optimized design, 420 shows the non-optimized design, and 430 shows the fully passive IRS system.

Figure 5:
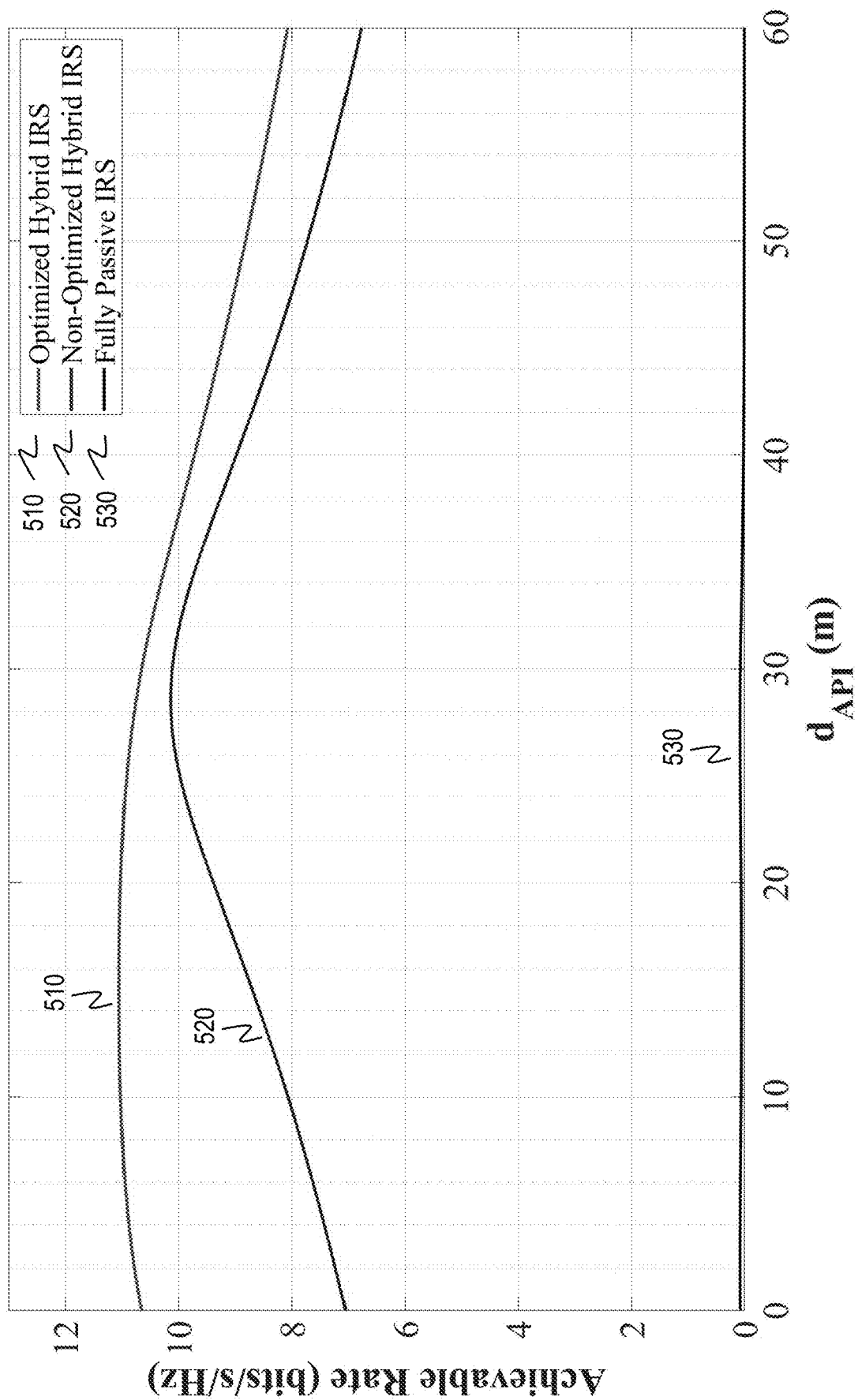
FIG. 5 discloses performance aspects of the embodiments disclosed herein.

FIG. 5 exhibits the achievable rate as a function of the distance between the IRS 140 and the transmitter 110 increases (K=20 dBm). The position of the center of the IRS is set to AP (−7, $d_y$, 4) m, and parameter $d_y$ is varied from 0 m to 60 m. It is clear that the disclosed optimized design makes the active-passive IRS-SISO system deliver higher achievable rates as $d_y$ increases. The superiority is evident when the IRS 140 is closer to the transmitter 110. In FIG. 5, 510 shows the disclosed optimized design, 520 shows the non-optimized design, and 530 shows the fully passive IRS system.

D. Example System Implementing Example System Model and Design

Figure 6A:
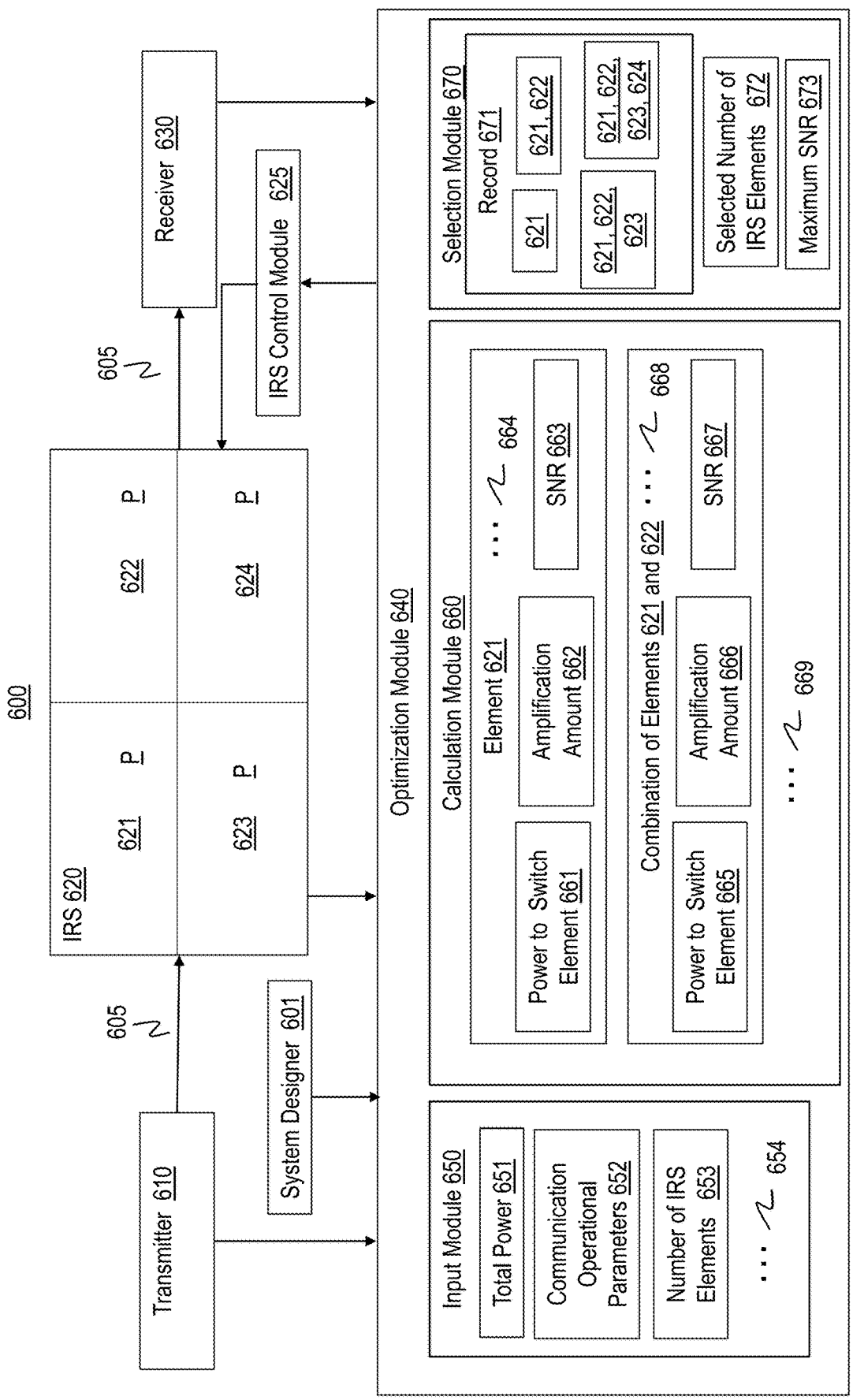
FIGS. 6A-6C illustrate aspects of a communication system for determining the number of active elements needed to achieve a maximum SNR of a wireless signal received at a receiver according to the embodiments disclosed herein.

FIG. 6A illustrates an embodiment of a communication system 600, which may be a SISO communication system, that is able to implement the model system and design discussed above to determine the number of elements of the IRS that should be made active in order to achieve a maximum SNR of the wireless signal received at the transmitter. As illustrated, the communication system 600, which may correspond to the SISO communication system 100 of FIG. 1 includes a transmitter 610, an IRS 620 having four elements 621, 622, 623, and 624, and a receiver 630. The transmitter 610, the IRS 620, and the receiver 630 may correspond to the transmitter 110, the IRS 140, and the receiver 120 respectively. As shown in the figure, the transmitter 610 transmits a wireless signal 605 to the receiver 630 via the IRS 620.

The communication system 600 also includes an optimization module 640, which may be implemented in a computing system that is associated with, though not necessarily part of the communication system 600. For example, the optimization module 640 may be operated by a system designer 601 who designs and implements the communication system 600. In operation, the optimization module 640 receives various inputs about the communication system 600 and then performs calculations on the inputs to determine the number of elements of the IRS 620 that should be switched from being a passive element to an active element so as to maximize an SNR of the wireless signal 605 received at the receiver 630.

As illustrated, the optimization module 640 include an input module 650 that in operation receives the various inputs about the communication system 600. The various inputs may be received from the transmitter 610, the IRS 620, and/or the receiver 630. In addition, the system designer 601 may also provide one or more of the inputs to the input module 650. The various inputs include the total power amount 651 available for signal transmission at the transmitter 610 and any elements of the IRS 620 that are switched to be active elements. The total power may be supplied by various non-illustrated power sources. The inputs may also include communication operational parameters 652 such as a noise floor when there are no active elements (i.e., no elements are switched from being a passive element to an active element) and a noise floor when one or more of the IRS elements are switched from passive elements to active elements. The various inputs also include the overall number of elements implemented in the IRS 653. In the illustrated embodiment, the IRS has four elements 621, 622, 623, and 624 that are initially shown as being passive elements as illustrated by the label "P". It will be appreciated that four elements is only for illustration and that the IRS 620 can be implemented with any reasonable number of elements as the system needs warrant. There may any number of additional inputs 654 as illustrated by the ellipses such as one or more of a distance between the transmitter 610 and the IRS 620 and a distance between the IRS 620 and the receiver 630 and/or an amplification efficiency for each of the elements that are switched from passive elements to active elements.

The optimization module 640 also includes a calculation module 660 that in operation performs operations on the various inputs using the processes and equations described in section B herein. In one embodiment, the calculation module 660 may use an algorithm such as the algorithm shown in FIG. 7 when performing the operations on the inputs. It will be noted that the algorithm shown in FIG. 7 uses the notations of the processes and equations described in section B herein.

In operation, whether using the algorithm shown in FIG. 7 or some other algorithm, the calculation module 660 calculates for the element 621, which may be considered a first element of the IRS 620, a portion of the total power amount 651 that is needed to switch the element 621 from a passive element to an active element and then continue to operate the active element as shown at 661. The calculation module 660 also calculates an amplification amount or coefficient as shown at 662 for the element 621. The calculation module 660 further calculates the SNR of the wireless signal 605 received at the receiver 630 when the element 621 is switched from a passive element to an active element as shown at 663. The calculation module 660 may also calculate further values such as a reflection coefficient for the element 621 as illustrated by the ellipses 664. It will be noted that although the description is of calculations being performed for the element 621, this is for ease of explanation only as the calculations may be performed on any of the elements. Thus, an important concept is that the calculation module 660 first performs calculations for one element of the IRS 620.

The calculation module 660 then calculates for a combination of the element 621 and the element 622, which may be considered a second element of the IRS 620, a portion of the total power amount 651 that is needed to switch both the elements 621 and 622 from passive elements to active elements and then continue to operate the active elements as shown at 665. The calculation module 660 also calculates an amplification amount or coefficient as shown at 666 for the combination of the elements 621 and 622. The calculation module 660 further calculates the SNR of the wireless signal 605 received at the receiver 630 when both the elements 621 and 622 are switched from passive elements to active elements as shown at 667. The calculation module 660 may also calculate further values such as a reflection coefficient for the combination of the elements 621 and 622 as illustrated by the ellipses 668. It will be noted that although the description is of calculations being performed for the combination of the elements 621 and 622, this is for ease of explanation only as calculations may be performed for the combination of any two elements. Thus, an important concept is that after performing calculations for one element, the calculation module 660 performs calculations for two of the elements, which in the illustrated embodiment is elements 621 and 622.

The calculation module 660 then repeats this process for all combinations of elements of the IRS 620 as illustrated by the ellipses 669. For example, the calculation module 660 will calculate the portion of the total power amount 651 that is needed to switch the combination of the elements 621, 622, and 623 (for example, calculations performed for three elements of the IRS 620) from passive elements to active elements and then continue to operate the active elements, an amplification amount or coefficient for the combination of the elements 621, 622, and 623, and calculate the SNR of the wireless signal 605 received at the receiver 630 when the combination of the elements 621, 622, and 623 are switched from passive elements to active elements. Likewise, the calculation module 660 will calculate the portion of the total power amount 651 that is needed to switch the combination of the elements 621, 622, 623, and 624 (for example, calculations performed for four elements of the IRS 620) from passive elements to active elements and then continue to operate the active elements, an amplification amount or coefficient for the combination of the elements 621, 622, 623, and 624, and calculate the SNR of the wireless signal 605 received at the receiver 630 when the combination of the elements 621, 622, 623, and 624 are switched from passive elements to active elements.

The ellipses 669 also represent that the calculation module 660 can calculate additional values as needed. For example, the calculation module 660 can calculate a reflecting amount or coefficient for all the elements that are not switched from a passive element to an active element. The calculation module 660 can calculate the portion of the total power amount 651 that is to be allocated to the transmitter 610.

The optimization module 640 also includes a selection module 670. The selection module 670 includes a record 671, which may be a table of results, where the results of the calculations performed by the calculation module 660 are stored. As shown in the figure, the record 671 includes the results of the calculations for the element 661, the results of the calculations for the combination of the elements 621 and 622, the results of the calculations for the combination of the elements 621, 622 and 623, and the results of the calculations for the combination of the elements 621, 622, 623 and 624.

The selection module 670 then will analyze the results in the record 671 to select the number of elements of the IRS that should be switched from passive elements to active elements so as to achieve a maximum SNR of the wireless signal 605 received at the receiver 630. As illustrated in the figure, the selected number of elements 672 will achieve the maximum SNR 673.

The selected number of elements 672 is then provided as output to an IRS control module 625. The IRS control module 625 represents the hardware and software that are configured to switch an element of the IRS 620 from a passive element to an active element. The IRS control module 625 then switches the number of elements 672 specified in the output from passive elements to active elements.

Figure 6B:
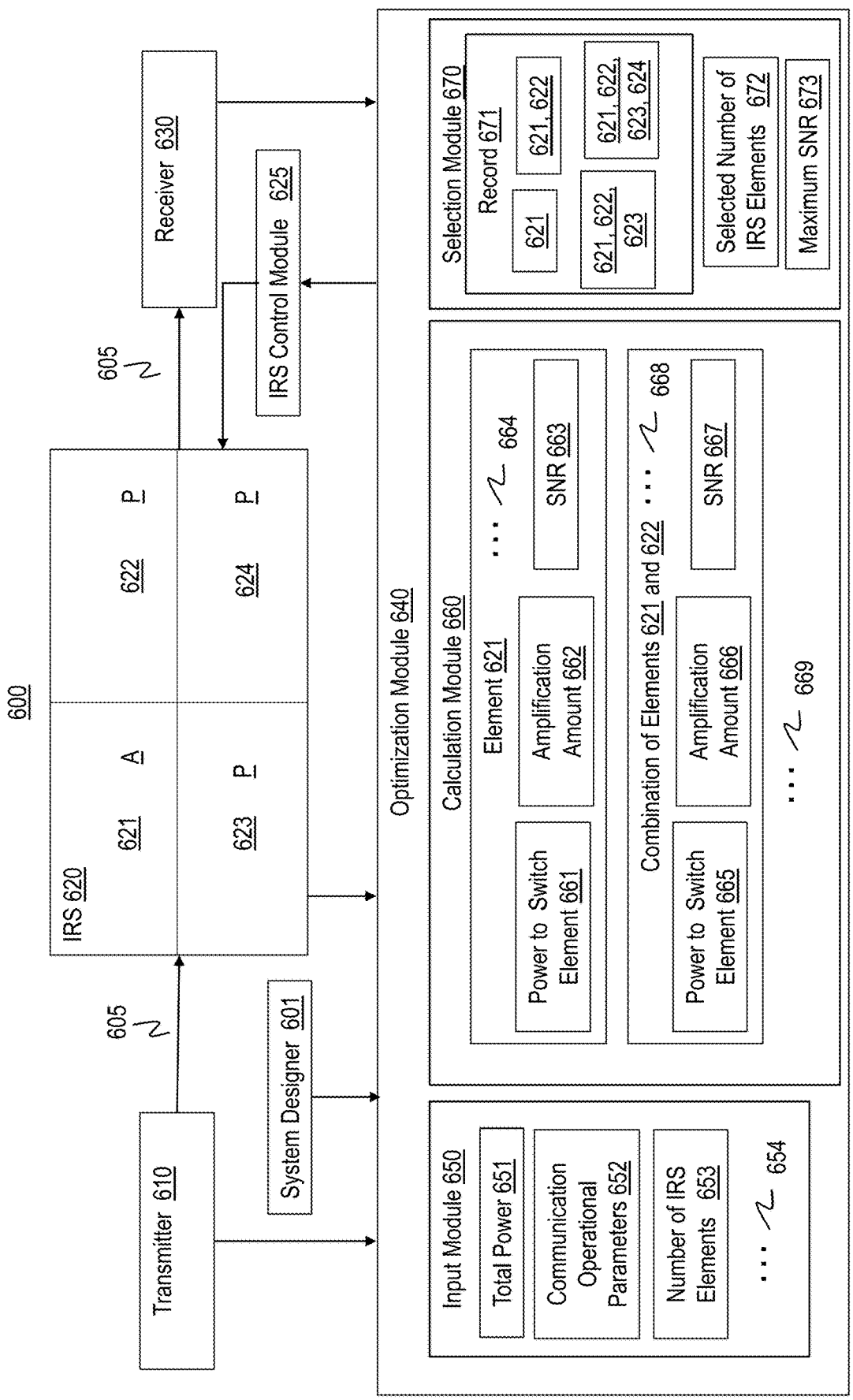

For example, FIG. 6B shows an embodiment where the selected number of elements 672 that will achieve the maximum SNR 673 of the wireless signal 605 at the receiver 630 was found to be one element. Accordingly, in FIG. 6B the IRS control module 625 switches the element 621 from passive to active as represented by the label "A". As an active element, the element 621 is able to provide amplification and phase shifting to the wireless signal 605. Although in FIG. 6B the element 621 is switched to being active, this is for illustration only as any of the other elements could have been switched. Thus, an important point is that one of the elements is switched from passive to active.

Figure 6C:
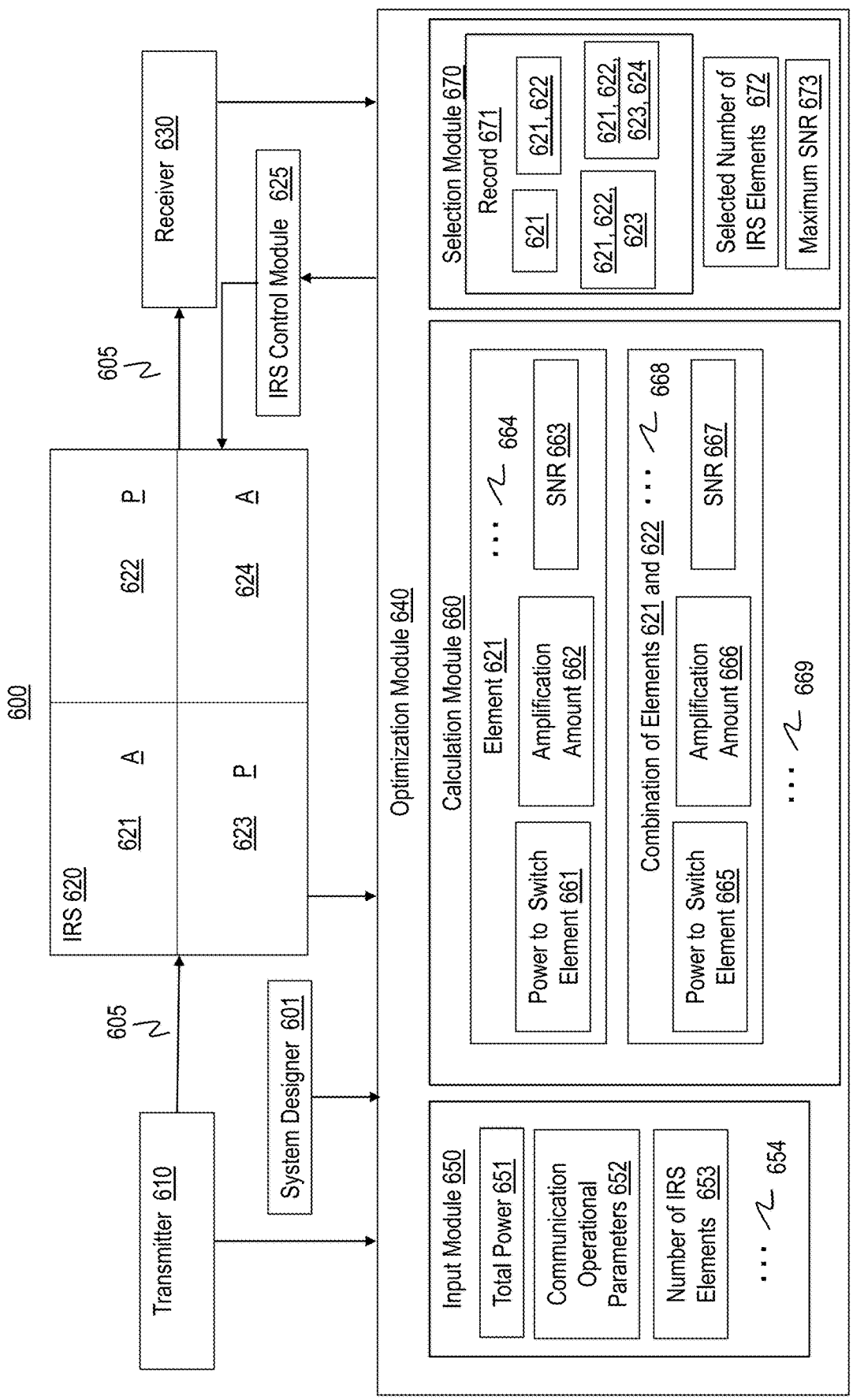

Similarly, FIG. 6C shows an embodiment where the selected number of elements 672 that will achieve the maximum SNR 673 of the wireless signal 605 at the receiver 630 was found to be two elements. Accordingly, in FIG. 6C the IRS control module 625 switches the elements 621 and 624 from passive to active as represented by the label "A". As active elements, the elements 621 and 624 are able to provide amplification and phase shifting to the wireless signal 605. Although in FIG. 6C the elements 621 and 624 are switched to being active, this is for illustration only as any of the other elements could have been switched. Thus, an important point is that two of the elements are switched from passive to active.

E. Example Methods

Figure 8:
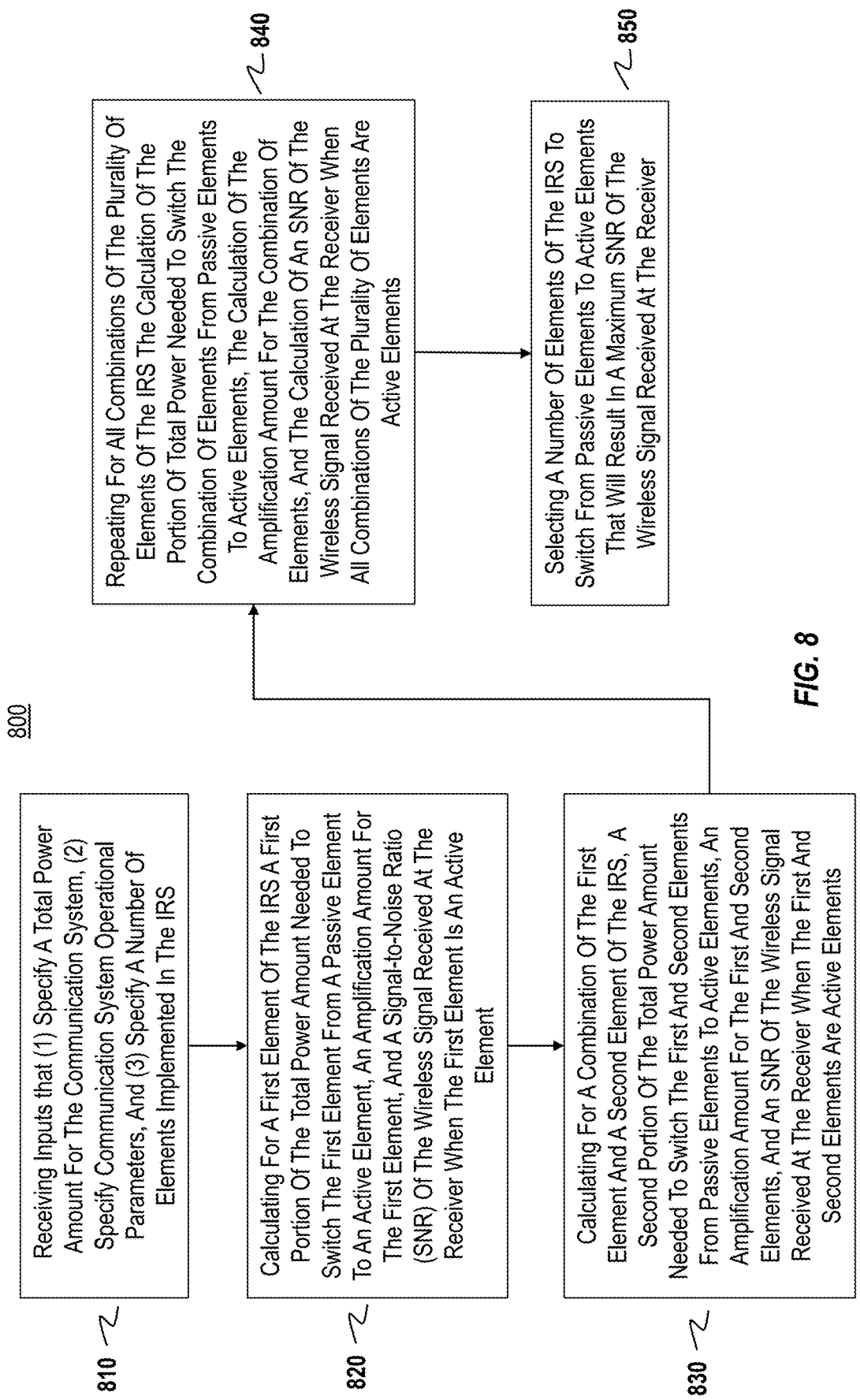
FIG. 8 illustrates aspects of a flowchart of an example method for determining the number of active elements needed to achieve a maximum SNR of a wireless signal received at a receiver according to the embodiments disclosed herein.

It is noted with respect to the disclosed methods, including the example method of FIG. 8, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 8, an example method 800 for determining the number of active elements needed to achieve a maximum SNR of a wireless signal received at a receiver is disclosed. The method 800 may be implemented in a communication system including a transmitter configured to transmit a wireless signal, a receiver, and an Intelligent Reflective Surface (IRS) that receives the wireless signal from the transmitter and provides the wireless signal to the receiver, the IRS including a plurality of elements that are configured to be switchable from being a passive element to an active element that is able to provide amplification to the wireless signal when power is supplied to the element. The method 800 will be described in relation to one or more of the figures previously described, although the method 800 is not limited to any particular embodiment.

The method 800 includes receiving a plurality of inputs, the plurality of input at least (1) specifying a total power amount for the communication system, the total power amount being the amount of power available to power the transmitter and the plurality of elements of the IRS, (2) specifying one or more communication system operational parameters, and (3) specifying a number of elements implemented in the IRS (810). For example, as previously described the optimization module 640 receives the inputs 651-654 into the input module 650.

The method 800 includes based on the plurality of inputs, calculating for a first element implemented in the IRS a first portion of the total power amount needed to switch the first element from a passive element to an active element, an amplification amount for the first element, and a signal-to-noise ratio (SNR) of the wireless signal received at the receiver when the first element is an active element (820). For example, as previously described the calculation module 660 performs operations on the first element 621 using the equations and processes described in section B disclosed herein and/or using the example algorithm of FIG. 7 to calculate the power needed to switch 661 the element 621 to an active element, the amplification amount 662, and the SNR of the wireless signal 605 at the receiver 630 when the element 621 is an active element.

The method 800 includes based on the inputs, calculating for a combination of the first element and a second element implemented in the IRS, a second portion of the total power amount needed to switch the first and second elements from passive elements to active elements, an amplification amount for the first and second elements, and an SNR of the wireless signal received at the receiver when the first and second elements are active elements (830). For example, as previously described the calculation module 660 performs operations on the combination of the first element 621 and the second element 622 using the equations and processes described in section B disclosed herein and/or using the example algorithm of FIG. 7 to calculate the power portion 665 needed to switch the elements 621 and 622 to active elements, the amplification amount 666, and the SNR of the wireless signal 605 at the receiver 630 when the elements 621 and 622 are active elements.

The method 800 includes based on the input, repeating for all combinations of the plurality of elements implemented in the IRS the calculation of the portion of total power needed to switch the combination of elements from passive elements to active elements, the calculation of the amplification amount for the combination of elements, and the calculation of an SNR of the wireless signal received at the receiver when all combinations of the plurality of elements are active elements (840). For example, as previously described the calculation module 660 performs operations such as those described in acts 820 and 830 on all the combinations of the elements of the IRS 620 as represented by 669.

The method 800 includes based on the calculations, selecting a number of elements of the IRS implemented in the IRS to switch from passive elements to active elements that will result in a maximum SNR of the wireless signal received at the receiver (850). For example, as previously described the selection module 670 selects the selected number of elements 672 that will achieve the maximum SNR 673.

F. Further Example Embodiments

Following are some further example embodiments of the invention. These are presented only by way of example and are not intended to limit the scope of the invention in any way.

Embodiment 1. In a communication system including a transmitter configured to transmit a wireless signal, a receiver, and an Intelligent Reflective Surface (IRS) that receives the wireless signal from the transmitter and provides the wireless signal to the receiver, the IRS including a plurality of elements that are configured to be switchable from being a passive element to an active element that is able to provide amplification to the wireless signal when power is supplied to the element, a method comprising: receiving a plurality of inputs, the plurality of input at least (1) specifying a total power amount for the communication system, the total power amount being the amount of power available to power the transmitter and the plurality of elements of the IRS, (2) specifying one or more communication system operational parameters, and (3) specifying a number of elements implemented in the IRS; based on the plurality of inputs, calculating for a first element implemented in the IRS a first portion of the total power amount needed to switch the first element from a passive element to an active element, an amplification amount for the first element, and a signal-to-noise ratio (SNR) of the wireless signal received at the receiver when the first element is an active element; based on the inputs, calculating for a combination of the first element and a second element implemented in the IRS, a second portion of the total power amount needed to switch the first and second elements from passive elements to active elements, an amplification amount for the first and second elements, and an SNR of the wireless signal received at the receiver when the first and second elements are active elements; based on the input, repeating for all combinations of the plurality of elements implemented in the IRS the calculation of the portion of total power needed to switch the combination of elements from passive elements to active elements, the calculation of the amplification amount for the combination of elements, and the calculation of an SNR of the wireless signal received at the receiver when all combinations of the plurality of elements are active elements; and based on the calculations, selecting a number of elements of the IRS implemented in the IRS to switch from passive elements to active elements that will result in a maximum SNR of the wireless signal received at the receiver.

Embodiment 2. The method of embodiment 1, further comprising: calculating for the all combinations of the plurality of elements implemented in the IRS a reflecting amount for those elements that are not switched to active elements.

Embodiment 3. The method of embodiments 1-2, wherein the elements that are switched to active elements are configured to provide amplification and phase shifting to the transmitted wireless signal.

Embodiment 4. The method of embodiment 1-3, further comprising: based on the inputs, calculating, in addition to the portion of the total power amount needed to switch the elements from passive elements to active elements, a portion of the total amount of power allocated to the transmitter.

Embodiment 5. The method of embodiments 1-4, wherein the operational parameters of the communication system include a noise floor of the system when no elements are switched from passive elements to active elements.

Embodiment 6. The method of embodiments 1-5, wherein the operational parameters of the communication system include a noise floor when one or more of the elements are switched from passive elements to active elements.

Embodiment 7. The method of embodiments 1-6, wherein the input further includes an amplification efficiency for each of the elements that are switched from passive elements to active elements.

Embodiment 8. The method of embodiments 1-7, further comprising: providing output including the selected number of elements to switch from passive elements to active elements to the IRS, the output configured to cause the IRS to switch the selected number of elements from passive elements to active elements.

Embodiment 9. The method of embodiments 1-8, wherein the communication system is a single-input single output (SINO) communication system.

Embodiment 10. The method of embodiments 1-9, wherein the operational parameters of the communication system includes one or more of a distance between the transmitter and the IRS and a distance between the IRS and the receiver.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to conduct executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
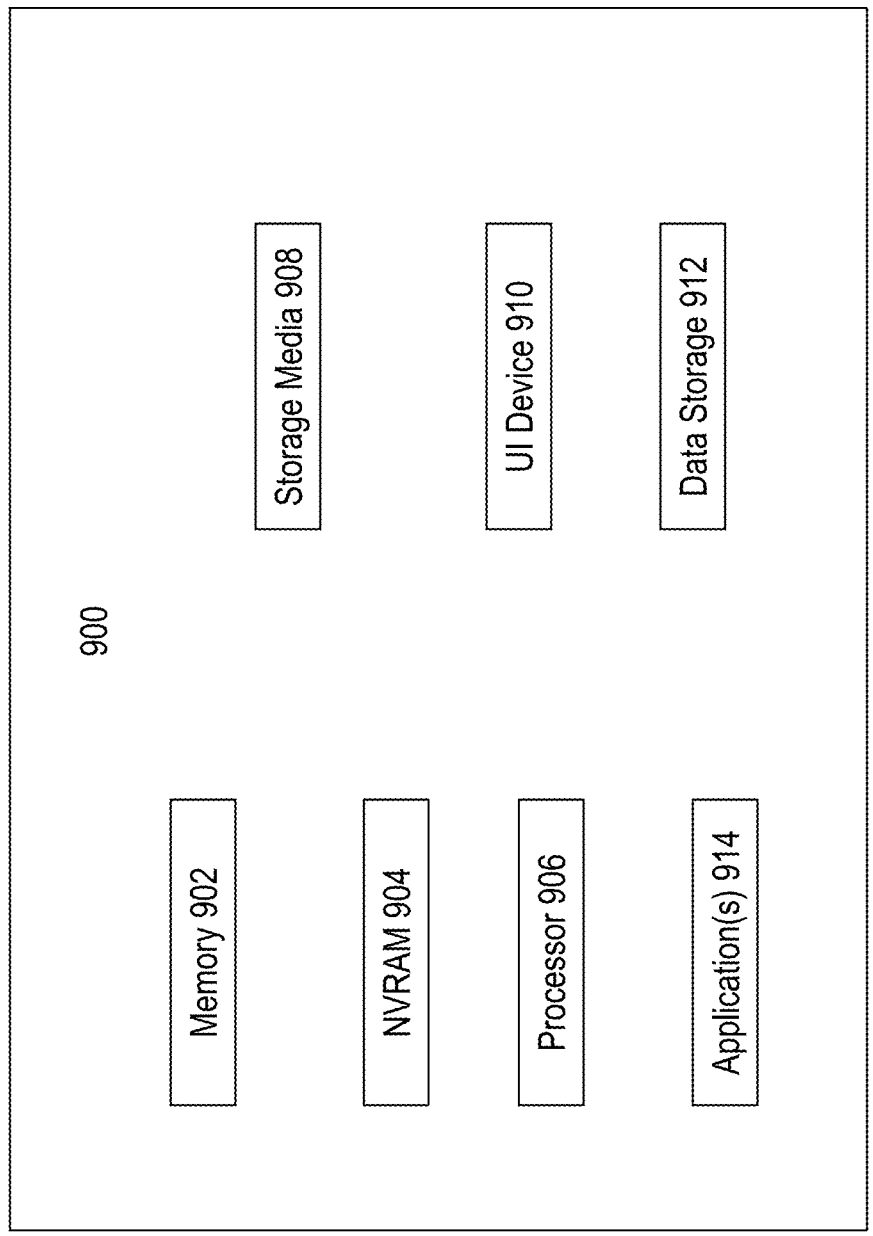
FIG. 9 illustrates an example computing system operable to perform any of the disclosed methods, processes, and operations.

With reference briefly now to FIG. 9, any one or more of the entities disclosed, or implied, by the Figures and/or elsewhere herein, may take the form of, or include, or be implemented on, or hosted by, a physical computing device, one example of which is denoted at 900. Also, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the components of the memory 902 of the physical computing device 900 may take the form of solid-state device (SSD) storage. Also, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a communication system including a transmitter configured to transmit a wireless signal, a receiver, and an Intelligent Reflective Surface (IRS) that receives the wireless signal from the transmitter and provides the wireless signal to the receiver, the IRS including a plurality of elements whose function is switchable from operating as a passive element that is operable to reflect the wireless signal without amplifying the wireless signal, to operating as an active element that is able to provide amplification to the wireless signal when power is supplied to the active element, a method comprising:

receiving a plurality of inputs, the plurality of inputs at least (1) specifying a total power amount for the communication system, the total power amount being the amount of power available to power the transmitter and the plurality of elements of the IRS, (2) specifying one or more communication system operational parameters, and (3) specifying a number of elements implemented in the IRS;

based on the plurality of inputs, calculating for a first element implemented in the IRS a first portion of the total power amount needed to switch the first element from operating as a passive element to operating as an active element, an amplification amount for the first element, and a signal-to-noise ratio (SNR) of the wireless signal received at the receiver when the first element is an active element;

based on the inputs, calculating for a combination of the first element and a second element implemented in the IRS, a second portion of the total power amount needed to switch the first and second elements from operating as passive elements to operating as active elements, an amplification amount for the first and second elements, and an SNR of the wireless signal received at the receiver when the first and second elements are operating as active elements;

based on the input, repeating for all combinations of the plurality of elements implemented in the IRS the calculation of the portion of total power needed to switch the combination of elements from operating as passive elements to operating as active elements, the calculation of the amplification amount for the combination of elements, and the calculation of an SNR of the wireless signal received at the receiver when all combinations of the plurality of elements are operating as active elements; and based on the calculations, selecting a number of elements of the IRS implemented in the IRS to switch from operating as passive elements to operating as active elements that will result in a maximum SNR of the wireless signal received at the receiver.

2. The method of claim 1, further comprising:
calculating for the all combinations of the plurality of elements implemented in the IRS a reflecting amount for those elements that are not switched to active elements.

3. The method of claim 1, wherein the elements that are switched to active elements are configured to provide amplification and phase shifting to the transmitted wireless signal.

4. The method of claim 1, further comprising:
based on the inputs, calculating, in addition to the portion of the total power amount needed to switch the elements from passive elements to active elements, a portion of the total amount of power allocated to the transmitter.

5. The method of claim 1, wherein the operational parameters of the communication system include a noise floor of the system when no elements are switched from passive elements to active elements.

6. The method of claim 1, wherein the operational parameters of the communication system include a noise floor when one or more of the elements are switched from passive elements to active elements.

7. The method of claim 1, wherein the input further includes an amplification efficiency for each of the elements that are switched from passive elements to active elements.

8. The method of claim 1, further comprising:
providing output including the selected number of elements to switch from passive elements to active elements to the IRS, the output configured to cause the IRS to switch the selected number of elements from passive elements to active elements.

9. The method of claim 1, wherein the communication system is a single-input single output (SISO) communication system.

10. The method of claim 1, wherein the operational parameters of the communication system include one or more of a distance between the transmitter and the IRS and a distance between the IRS and the receiver.

11. In a communication system including a transmitter configured to transmit a wireless signal, a receiver, and an Intelligent Reflective Surface (IRS) that receives the wireless signal from the transmitter and provides the wireless signal to the receiver, the IRS including a plurality of elements whose function is switchable from operating as a passive element that is operable to reflect the wireless signal without amplifying the wireless signal, to operating as an active element that is able to provide amplification to the wireless signal when power is supplied to the active element, a non-transitory computer-readable storage medium having stored therein instructions that are executable by one or more hardware processors to cause the one or more hardware processors to perform operations comprising:
receiving a plurality of inputs, the plurality of inputs at least (1) specifying a total power amount for the communication system, the total power amount being the amount of power available to power the transmitter and the plurality of elements of the IRS, (2) specifying one or more operational parameters of the communication system, and (3) specifying one or more operational parameters of the IRS including a number of elements implemented in the IRS;
based on the plurality of inputs, calculating for a first element implemented in the IRS a first portion of the total power amount needed to switch the first element from operating as a passive element to operating as an active element, an amplification amount for the first element, and a signal-to-noise ratio (SNR) of the wireless signal received at the receiver when the first element is an active element;
based on the inputs, calculating for a combination of the first element and a second element implemented in the IRS, a second portion of the total power amount needed to switch the first and second elements from operating as passive elements to operating as active elements, an amplification amount for the first and second elements, and an SNR of the wireless signal received at the receiver when the first and second elements are operating as active elements;
based on the input, repeating for all combinations of the plurality of elements implemented in the IRS the calculation of the portion of total power needed to switch the combination of elements from operating as passive elements to operating as active elements, the calculation of the amplification amount for the combination of elements, and the calculation of an SNR of the wireless signal received at the receiver when all combinations of the plurality of elements are operating as active elements; and
based on the calculations, selecting a number of elements of the IRS implemented in the IRS to switch from operating as passive elements to operating as active elements that will result in a maximum SNR of the wireless signal received at the receiver.

12. The non-transitory computer-readable storage medium of claim 11, the one or more hardware processors further caused to perform the following operations:
calculating for the all combinations of the plurality of elements implemented in the IRS a reflecting amount for those elements that are not switched to active elements.

13. The non-transitory computer-readable storage medium of claim 11, wherein the elements that are switched to active elements are also configured to provide amplification and phase shifting to the transmitted wireless signal.

14. The non-transitory computer-readable storage medium of claim 11, the one or more hardware processors further caused to perform the following operations:
based on the inputs, calculating, in addition to the portion of the total power amount needed to switch the elements from passive elements to active elements, a portion of the total amount of power allocated to the transmitter.

15. The non-transitory computer-readable storage medium of claim 11, wherein the operational parameters of the communication system include a noise floor of the system when no elements are switched from passive elements to active elements.

16. The non-transitory computer-readable storage medium of claim 11, wherein the operational parameters of the communication system include a noise floor when one or more of the elements are switched from passive elements to active elements.

17. The non-transitory computer-readable storage medium of claim 11, wherein one or more operational parameters of the IRS include an amplification efficiency for each of the elements that are switched from passive elements to active elements.

18. The non-transitory computer-readable storage medium of claim 11, the one or more hardware processors further caused to perform the following operations:
providing output including the selected number of elements to switch from passive elements to active elements to the IRS, the output configured to cause the IRS to switch the selected number of elements from passive elements to active elements.

19. The non-transitory computer-readable storage medium of claim 11, wherein the communication system is a single-input single output (SISO) communication system.

20. The non-transitory computer-readable storage medium of claim 11, wherein the operational parameters of the communication system include one or more of a distance between the transmitter and the IRS and a distance between the IRS and the receiver.

* * * * *